(12) United States Patent  
Holmström et al.

(10) Patent No.: US 8,139,598 B2
(45) Date of Patent: Mar. 20, 2012

(54) AUTOMATIC QOS CONFIGURATION

(75) Inventors: Tomas Holmström, Dalby (SE); Svante Alnås, Lund (SE); Krister Sällberg, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1428 days.

(21) Appl. No.: 11/276,838

(22) Filed: Mar. 16, 2006

(65) Prior Publication Data

US 2006/0221829 A1 Oct. 5, 2006

Related U.S. Application Data

(60) Provisional application No. 60/663,901, filed on Mar. 21, 2005.

(51) Int. Cl.
*H04W 4/00* (2009.01)
(52) U.S. Cl. ............... 370/443; 370/338; 455/435.1; 455/435.2; 455/433; 455/419
(58) Field of Classification Search ............ 455/432.3, 455/433, 434, 435.2, 411, 418, 419, 435.1; 370/338

See application file for complete search history.

(56) References Cited

U.S. PATENT DOCUMENTS

| | | | | |
|---|---|---|---|---|
| 5,751,798 | A * | 5/1998 | Mumick et al. | 379/114.24 |
| 6,904,058 | B2 * | 6/2005 | He et al. | 370/477 |
| 7,318,111 | B2 * | 1/2008 | Zhao | 709/250 |
| 2002/0028673 | A1 * | 3/2002 | Chang et al. | 455/419 |
| 2003/0208582 | A1 | 11/2003 | Persson et al. | |
| 2005/0018633 | A1 | 1/2005 | Shirota et al. | |
| 2005/0059397 | A1 | 3/2005 | Zhao | |

FOREIGN PATENT DOCUMENTS

EP 1 035 751 A2 9/2000

OTHER PUBLICATIONS

3GPP Ts 23.060 V6.10.0 (Sep. 2005) 3rd Generation Partnership Project; Technical Specification Group Services and System Aspects; General Packet Radio Service (GPRS); Service description; Stage 2 (Release 6).
3GPP Ts 29.208 V6.5.0 (Sep. 2005) $3^{rd}$ Generation Partnership Project; Technical Specification Group Core Network and Terminals; End-to-end Quality of Service (QoS) signalling flows (Release 6).
Device Management Architecture; Draft Version x.y—May 30, 2005; Open Mobile Alliance; OMA-AD_DM-V1_0-20050530-D.
Provisioning Architecture Overview, Candidate Version 1.1—Apr. 28, 2005; Open Mobile Alliance; OMA-WAP-ProvArch-V1_1-20050428-C.
3GPP 3rd Generation Partnership Project: Technical Specification Group Core Network, End-to-end Quality of Service (QoS) Signalling Flows (Release 6), 3GPP TS 29.708 V6.2.0 Dec. 2004.

* cited by examiner

*Primary Examiner* — Temica M Beamer
(74) *Attorney, Agent, or Firm* — Roger S. Burleigh

(57) ABSTRACT

A UE is described herein that has a defined QoS database which is used to organize and store various QoS parameter sets which are used to help establish media flows. In one embodiment, the QoS database includes a plurality of tables, where each table is associated with a particular application, and where each table has a plurality of rows, and where each row includes a media type, a requested QoS parameter set, and an optional minimum QoS parameter set. An operator can use a communication network to populate/provision the QoS database. An operator can also use the communication network to fine-tune (update) the QoS database which enables them to enhance the bearer QoS for existing applications and to enable the appropriate bearer QoS for future applications.

8 Claims, 4 Drawing Sheets

US 8,139,598 B2

AUTOMATIC QOS CONFIGURATION

CROSS-REFERENCE TO RELATED APPLICATIONS

This application claims the benefit of U.S. Provisional Application No. 60/663,901, filed Mar. 21, 2005, the disclosure of which is incorporated herein by reference.

BACKGROUND OF THE INVENTION

1. Field of the Invention

The present invention relates to a device (e.g., user equipment (UE)) which has a quality of service (QoS) database that is provisioned and/or fine-tuned over the air by an operator of a communication network.

2. Description of Related Art

Referring to FIG. 1 (PRIOR ART), there is shown a block diagram which is used to help explain how an application's media flow(s) 101 (e.g., a push-to-talk over cellular (PoC) application, a voice over Internet Protocol (VoIP) application, a video application, a file transfer application) is currently established between a UE 100 and a communication network 102. Initially, the UE 100 (in particular an application 112) and the communication network 102 (which in this example has an IP Multimedia Subsystem (IMS) architecture) utilize Session Description Protocol (SDP) signaling to negotiate on an application level what type of media flow(s) 101 they want to establish (see step 1). Then, the UE 100 (in particular a session manager 124) and the communication network 102 (in particular a session manager 108) attempt to activate the bearer(s) (Packet Data Protocol (PDP) context(s)) which are needed to establish the media flow(s) 101 (see steps 2a-2c). For example, if a video application 401 was desired then there would be a voice bearer and a video bearer which would need to be activated. And, if a voice application 401 was desired then just a voice bearer would need to be activated. How these bearer(s) are activated is discussed next.

First, the UE 100 needs to generate a requested QoS parameter set 104 for each of the media flow bearer(s) which it then forwards to a Serving General Packet Radio Service (GPRS) Support Node 106 (SGSN 106) (in particular the session manager 108) within the communication network 102 (see step 2a). Secondly, the session manager 108 generates and forwards a negotiated QoS parameter set 110 for each of the bearer(s) to the UE 100 (see step 2b). Thirdly, the UE 100 (in particular the session manager 124) determines whether or not to accept the negotiated QoS parameter set(s) 110 which would be used to set-up the respective bearer(s) (see step 2c). If the UE 100 accepts the negotiated QoS parameter set(s) 110, then the media flow(s) 101 is/are established with the communication network 102 (see step 3). If the UE 100 does not accept any of the negotiated QoS parameter set(s) 110, then the corresponding bearer is deactivated and the corresponding media flow 101 is not established with the communication network 102. In this document, the step where the UE 100 generates the requested QoS parameter set(s) 104 which is sent to the communication network 102 is of particular interest. How the traditional UE 100 functions to generate the requested QoS parameter set(s) 104 is discussed next.

The traditional UE 100 can generate the requested QoS parameter set(s) 104 by using the following components: an application 112; a SDP handler 114 (optional); an Internet Protocol (IP) Bearer Service (BS) manager 116 (optional); a translation/mapping function 118; a Universal Mobile Telephone Service (UMTS) BS manager 120; a UMTS QoS Parameter Per Application Type database 122; and a session manager 124. These components 112, 114, 116, 118, 120, 122 and 124 generate the requested QoS parameter set(s) 104 as follows:

A. The application 112 provides the UMTS BS Manager 120, possibly via the IP BS Manager 116 and the Translation/Mapping function 118, the relevant information needed to perform step B or step D.

B. If needed, the UMTS BS Manager 120 uses information from step A to access a proper set of QoS Parameters from the UMTS QoS Parameter Per Application Type database 122. In this document it is assumed that this step is performed.

C. If the SDP handler 114 is available, then the SDP Parameters therefrom could provide guidance for the UMTS BS Manager 120 (possibly via the IP BS manager 116 and the translation/mapping function 118) to set a maximum bitrate uplink/downlink (UL/DL) and a guaranteed bitrate UL/DL.

D. A set of QoS Parameters values from step B (or directly from step A) is possibly merged at the session manager 124 together with the maximum bitrate UL/DL and the guaranteed bitrate UL/DL from step C. The result is the requested QoS parameter set(s) 104.

For a more detailed discussion about this UE 100 and this process, reference is made to section 7.2 of the following standard:

3GPP TS 29.208 v6.5.0 entitled "3rd Generation Partnership Project; Technical Specification Group Core Network and Terminals; End-to-end Quality of Service (QoS) Signalling Flows (Release 6)" September 2005.

The contents of this document are incorporated by reference herein.

A problem with this particular process is that the manufacturer of the UE 100 often utilizes their own proprietary process to add QoS values into the UMTS QoS Parameter Per Application Type database 122. This scheme has several drawbacks. First, the UE 100 does not have a defined UMTS QoS Parameter Per Application Type database 122 in which QoS values can be organized and stored. Secondly, an operator can not populate/provision the UMTS QoS Parameter Per Application Type database 122. Thirdly, the operator can not fine-tune (update) the QoS values stored within the UMTS QoS Parameter Per Application Type database 122. These problems and other problems are solved by the present invention.

BRIEF DESCRIPTION OF THE INVENTION

A UE is described herein that has a defined QoS database which is used to organize and store various QoS parameter sets which are used to help establish media flows. In one embodiment, the QoS database includes a plurality of tables, where each table is associated with a particular application, and where each table has a plurality of rows, and where each row includes a media type, a requested QoS parameter set, and an optional minimum QoS parameter set. An operator can use a communication network to populate/provision the QoS database. An operator can also use the communication network to fine-tune (update) the QoS database which enables them to enhance the bearer QoS for existing applications and to enable the appropriate bearer QoS for future applications.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 2A:
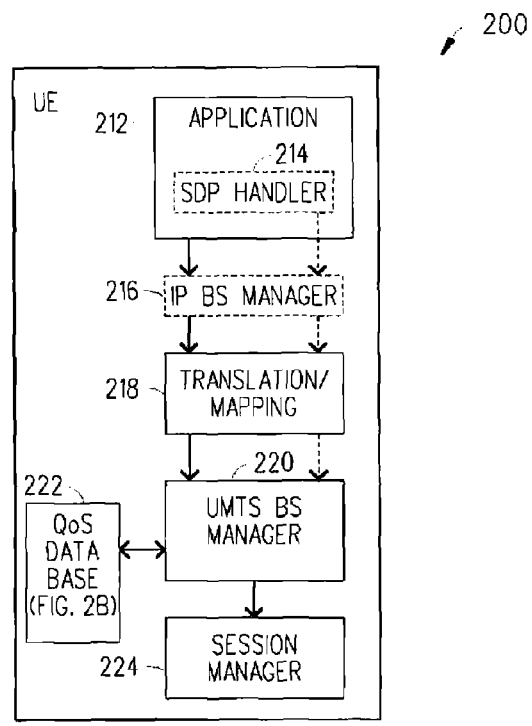
FIG. 2A is a block diagram of a UE which has a QoS database (e.g., enhanced UMTS QoS Parameter Per Application Type database) where QoS values can be organized and stored in accordance with the present invention.

Referring to FIG. 2A, there is shown a block diagram of a UE 200 which has a QoS database 222 (e.g., enhanced UMTS QoS Parameter Per Application Type database 222) with a defined format in which QoS values are organized and stored in accordance with the present invention. The exemplary UE 200 shown has the following components (which are relevant to this discussion): an application 212; an SDP handler 214 (optional); an IP BS manager 216 (optional); a translation/mapping function 218; an UMTS BS manager 220; the QoS database 222 (e.g., an enhanced UMTS QoS Parameter Per Application Type database 224); and a session manager 226. The components 212, 214, 216, 218, 220 and 224 happen to be well known to those skilled in the art. However, the enhanced QoS database 222 is new and happens to be a marked-improvement over the prior art as discussed next with respect to FIG. 2B.

Figure 2B:
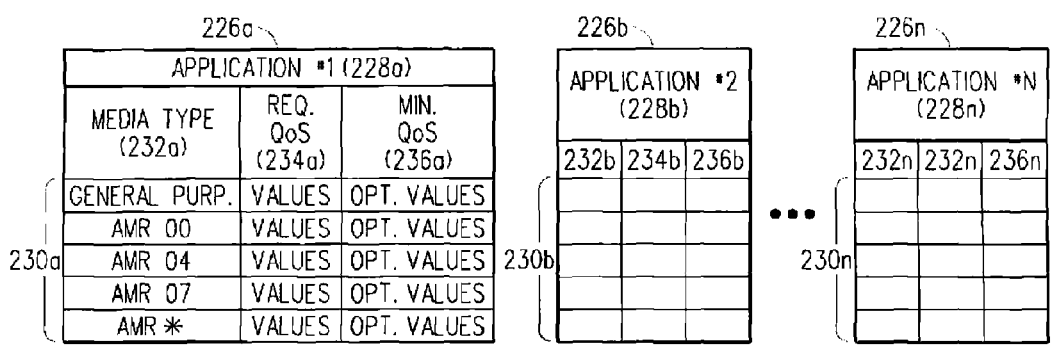
FIG. 2B is a block diagram that illustrates in greater detail the format of the QoS database (e.g., enhanced UMTS QoS Parameter Per Application Type database) shown in FIG. 2A in accordance with the present invention.

Referring to FIG. 2B, there is a block diagram that illustrates in greater detail the format of an exemplary QoS database 222. The exemplary QoS database 222 shown has one table 226a, 226b...226n per application 228a, 228b...228n (e.g., a push-to-talk over cellular (PoC) application, a VoIP application, a video application, a file transfer application). Each table 226a, 226b...226n has one or more rows 230a, 230b...230n where each individual row is associated with a media type, e.g., voice or video. In particular, each individual row 230a, 230b...230n contains a media type 232a, 232b...232n, a requested QoS parameter set 234a, 234b...234n and an optional minimum QoS parameter set 236a, 236b...236n. For example, the first table 226a which could be associated with a PoC application 228a has five rows 230a each of which is associated with a specific media type that has been identified as "General Purpose", "AMR00", "AMR04", "AMR07" and "AMR*". The "AMR" indicates an adaptive multi-rate and the "*" indicates a wildcard. This exemplary QoS database 222 happens to have tables 226a, 226b...226n which are defined to organize and store QoS parameters that would be used within the IMS architecture.

Figure 1:
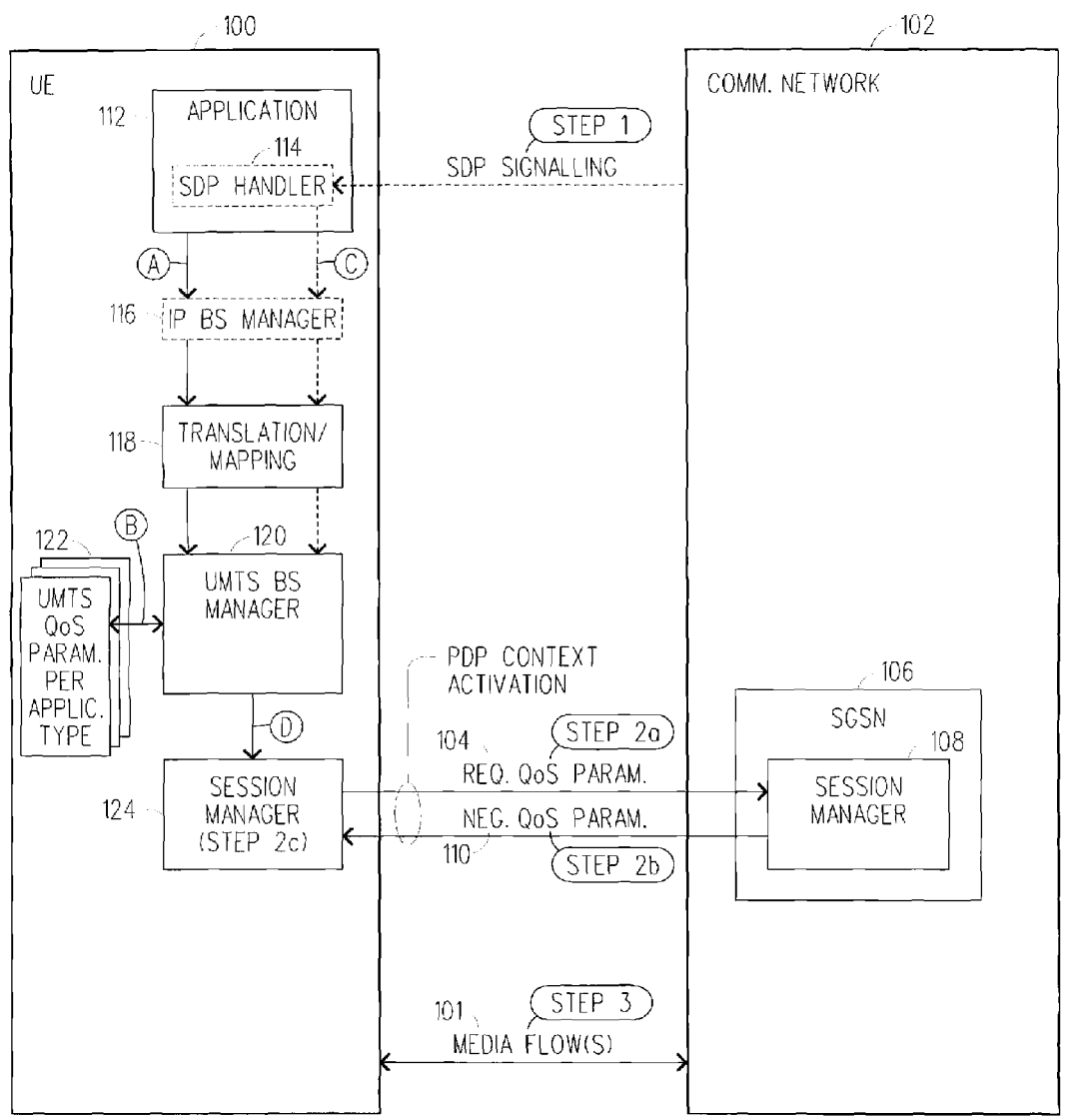
FIG. 1 (PRIOR ART) is a block diagram of a UE and a communication network which is used to help explain the current state of the art and why there is a need for the present invention.
Figure 3:
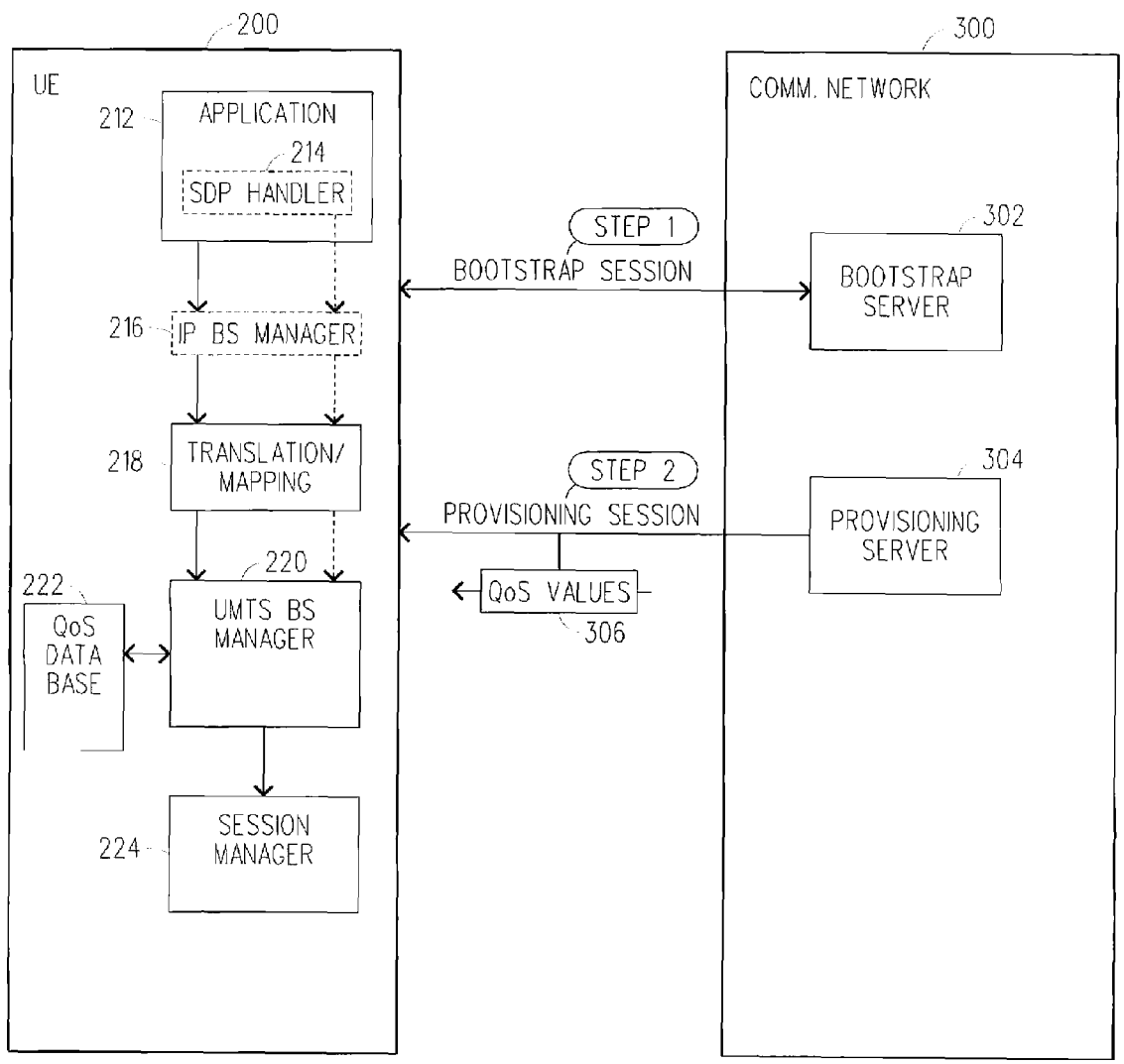
FIG. 3 is a block diagram which is used to help explain how an operator can use a communication network to populate/provision the UE's QoS database shown in FIG. 2B in accordance with the present invention.

Referring to FIG. 3, there is shown a block diagram which is used to help explain how an operator can use a communication network 300 to populate/provision the UE's QoS database 222 in accordance with the present invention. The communication network 300 is shown as having a bootstrap server 302 and a provisioning server 304. In operation, the UE 200 and the bootstrap server 302 can initiate a bootstrap session with one another over the air to establish a secure relationship (see step 1). Or, the bootstrap server 302 can store the bootstrap message (key) on a smart card which is inserted into the UE 200. The UE 200 and the provisioning server 304 then initiate a provisioning session with one another over the air so the provisioning server 304 can send QoS values 306 to the UE 200 which are stored within the QoS database 222 (see step 2). In particular, the provisioning server 304 (or the UE 200) can initiate the provisioning session using a key that was obtained during the bootstrap session. Then, the provisioning server 304 can send the QoS values 306 to the UE 200 which stores them within the QoS database 222. Alternatively the bootstrap server 302 could place the QoS values directly into the bootstrap message which is stored in a smart card that is inserted into the UE 200. This alternative is a simpler way for sending QoS values to the UE 200, because there are no messages that need to be sent from the UE 200 to the communication network 300. In either case, the operator can utilize the bootstrap server 302 and/or the provisioning server 304 to effectively populate/provision the QoS database 222. The operator can also use the bootstrap server 302 and/or provisioning server 304 to fine-tune (update) the QoS database 222. This is a marked improvement over the prior art in which the operator could not do any of these things because the manufacturer provisioned/populated the QoS database 122 when the UE 100 was manufactured (see FIG. 1).

Figure 4:
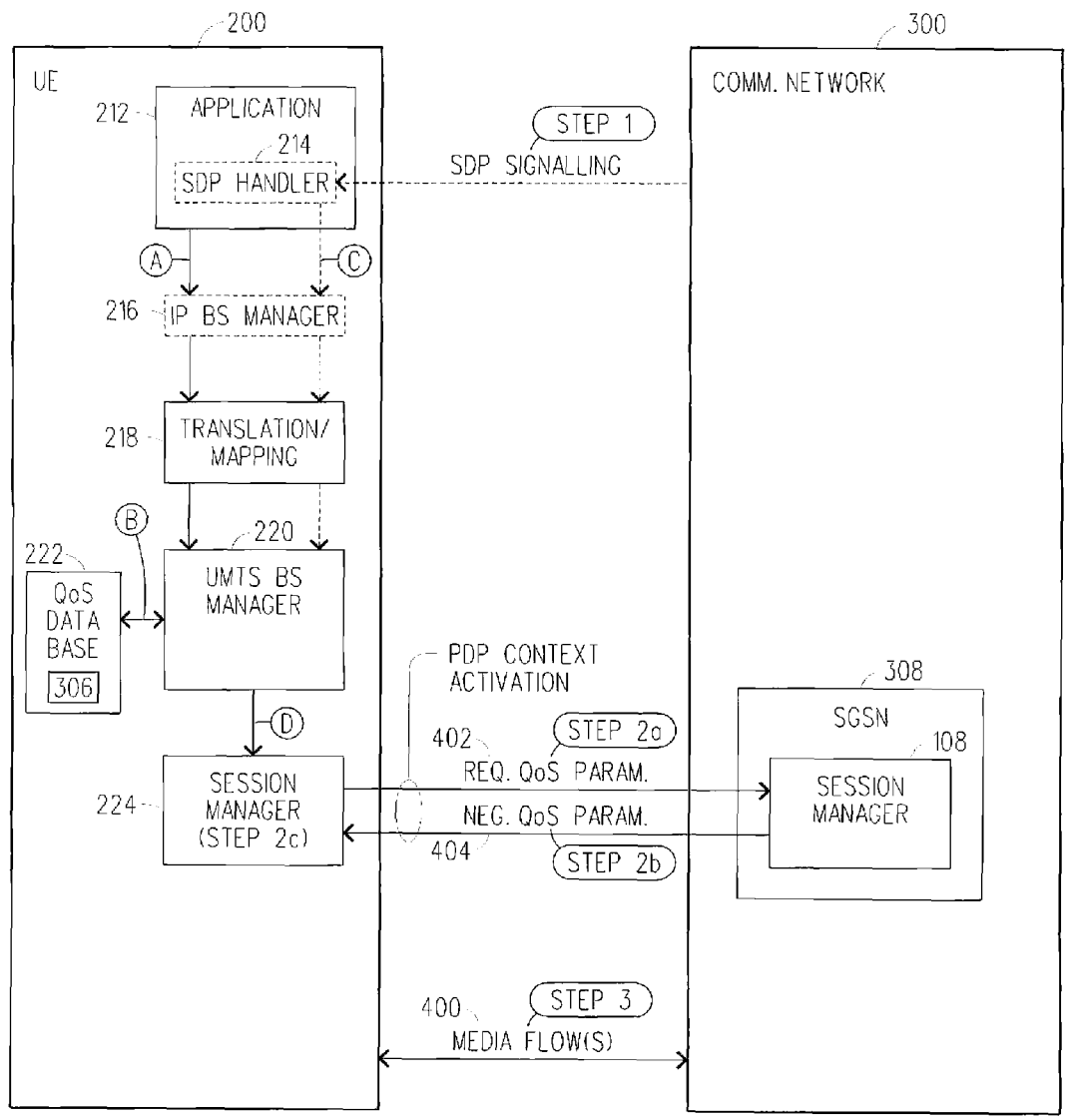
FIG. 4 is a block diagram which is used to help explain how the UE shown in FIG. 2A can utilize the populated QoS database therein to establish an application's media flow(s) with a communication network in accordance with the present invention.

Referring to FIG. 4, there is shown a block diagram which is used to help explain how the UE 200 can use the populated QoS database 222 therein to establish an application's media flows 400 with the communication network 300 in accordance with the present invention. Initially, the UE 200 (in particular the application 212) and communication network 300 (which in this example has an IMS architecture) utilize SDP signaling to negotiate on an application level what type of application 400 (e.g., a PoC application, a VoIP application, a video application, a file transfer application) they want to establish (see step 1). Then, the UE 200 (in particular a session manager 224) and the communication network 300 (in particular a session manager 310) attempt to activate the bearer(s) (Packet Data Protocol (PDP) context(s)) which are needed to establish the application's media flow(s) 400 (see steps 2a-2c). For example, if a video application 400 is desired then there would be a voice bearer and a video bearer which would need to be activated. And, if a voice application 400 is desired then just a voice bearer would need to be activated. How these bearer(s) are activated is discussed next.

First, the UE 200 needs to generate a requested QoS parameter set 402 for each of the media flow bearer(s) which it then forwards to a SGSN 308 (in particular the session manager 310) within the communication network 300 (see step 2a). Secondly, the session manager 310 generates and forwards a negotiated QoS parameter set 404 for each of the bearer(s) to the UE 200 (see step 2b). Thirdly, the UE 200 (in particular the session manager 224) determines whether or not to accept the negotiated QoS parameter set(s) 404 which would be used to set-up the respective bearer(s) (see step 2c). If the UE 200 accepts the negotiated QoS parameter set(s) 404, then the media flow(s) 400 is/are established with the communication network 300 (see step 3). If the UE 200 does not accept any of the negotiated QoS parameter set(s) 404, then the corresponding bearer is deactivated and the corresponding media flow 400 is not established with the communication network 300. In this document, the step where the UE 200 generates the requested QoS parameter set(s) 402 which is sent to the communication network 300 is of particular interest. How the UE 200 can generate the requested QoS parameter set(s) 402 is discussed next.

The UE 200 can generate the requested QoS parameter set(s) 402 by using the following components: the application 212; the SDP handler 214 (optional); the IP BS manager 216 (optional); the translation/mapping function 218; the UMTS BS manager 220; the QoS database 222 (e.g., enhanced UMTS QoS Parameter Per Application Type database 222); and the session manager 224. These components 212, 214, 216, 218, 220, 222 and 224 can generate the requested QoS parameter set(s) 402 as follows:

A. The application 212 provides the UMTS BS Manager 220, possibly via the IP BS Manager 216 and the Translation/Mapping function 218, the relevant information needed to perform step B or step D.

B. If needed, the UMTS BS Manager 220 uses information from step A to access a proper set of QoS Parameter sets 306 from the enhanced UMTS QoS Parameter Per Application Type database 222. In this document it is assumed that this step is performed.

C. If the SDP handler 214 is available, then the SDP Parameters therefrom could provide guidance for the UMTS BS Manager 220 (possibly via the IP BS manager 216 and the translation/mapping function 218) to set a maximum bitrate uplink/downlink (UL/DL) and a guaranteed bitrate UL/DL.

D. The QoS Parameter set(s) 306 from step B (or QoS Parameter values from step A) is possibly merged at the session manager 224 together with the maximum bitrate UL/DL and the guaranteed bitrate UL/DL from step C. The result is the requested QoS parameter set(s) 402.

From the foregoing, it can be seen that the UE 200 is a marked improvement over the prior art. Because, the UE 200 has a defined QoS database 222 which can be provisioned and/or fine-tuned over the air by an operator of a communication network 300. The UE 200 also has many other advantages as well some of which are discussed in the following list:

The QoS database 222 has tables 226a, 226b... 226n which can store QoS parameter sets 306 that are based on the QoS requirements of a particular type of communication network 300 (e.g., a communication network 300 with an IMS architecture). This is important because there are many different types of communication networks.

The operator can populate the QoS database 222 for existing applications and future applications. And, the operator can populate the QoS database 222 with QoS parameter sets that they would like to use to help establish the application's media flow(s) 400 within their communication network 300.

It should be appreciated that not all of the requested QoS parameters 404 need to be provisioned. Instead, some of the QoS parameters may be created with other mechanisms. For instance, it is possible to calculate some of the QoS values within the UE 200. As such, the UE 200 could select between QoS parameters that are calculated and QoS parameters that are provisioned. And, the UE 200 may not even need to expose the calculated QoS parameters to the provisioning server 304.

A benefit of having one table per application is that there is no need to standardize globally unique media type identifiers between different organizations. It is usually very hard to maintain a global registration organization and if this solution is used this is not needed.

The user of UE 200 does not have to worry about the QoS settings within the QoS database 222. In fact, because an operator can populate the QoS database 222 they can also make sure the QoS is coupled to the quality perceived by the user and to the network characteristics.

The QoS database 222 has one table per application which avoids a need to use globally unique identifiers which are required if a global QoS database is used. This means that the definitions of various identifiers can be based on the specific applications which are supported/standardized by specific organizations.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A device, comprising:
a database populated by an operator, including a plurality of tables, where each table is associated with a particular application, and wherein each table has a plurality of rows, and wherein each row further comprises a media type, a requested quality of service parameter set, and a minimum quality of service parameter set; and
a session manager to set-up a bearer with a communication network configured to obtain, from the database, the requested quality of service parameter set and the minimum quality of service parameter set of the media type associated with the bearer, send, to the communication network, the requested quality of service parameter set, receive, from the communication network, a negotiated quality of service parameter set;
and determine whether to accept the negotiated quality of service parameter set by comparing the negotiated quality of service parameter set to the minimum quality of service parameter set.

2. The device of claim 1, wherein said application is:
a voice over Internet Protocol application;
a push-to-talk over cellular application;
a video application; or
a file transfer application.

3. The device of claim 1, wherein said database is fine-tuned over the air by an operator.

4. A method for enabling a device to establish an application media flow with a communication network, said method comprising the steps of:
negotiating the type of media flow to be established with the communication network; and
setting-up a bearer for the media flow which is to be established with the communication network by:
interacting with a database populated by an operator which database has a plurality of tables, wherein each table is associated with a particular application, and wherein each table has a plurality of rows, and wherein each row includes a media type, a requested quality of service parameter set and a minimum quality of service parameter set;
obtaining, from the database, the requested quality of service parameter set and the minimum quality of service parameter set of the media type associated with the application;
sending, to the communication network, the requested quality of service parameter set;
receiving, from the communication network, a negotiated quality of service parameter set; and
determining whether or not to accept the negotiated quality of service parameter set by comparing the negotiated quality of service parameter set to the minimum quality of service parameter set.

5. The method of claim 4, wherein said application is:
a voice over Internet Protocol application;
a push-to-talk over cellular application;
a video application; or
a file transfer application.

6. The method of claim 4, wherein said database is fine-tuned over the air by an operator.

7. A user equipment configured to establish a media flow for an application, and further configured to:
negotiate what type of media flow is to be established with a communication network; and
set-up a bearer for the media flow which is to be established with the communication network by:
sending, to the communication network, a requested quality of service parameter set,
receiving, from the communication network, a negotiated quality of service parameter set, and
determining whether or not to accept the negotiated quality of service parameter set,
the user equipment comprises:
a defined quality of service database including quality of service parameter sets for particular applications and media types in the form of a plurality of tables, where each table is associated with a particular application, and where each table has a plurality of rows, and where each row includes a media type and a requested quality of service parameter set, wherein the database is adapted to be populated by an operator with quality of service parameter sets for particular applications and media types,
and that the user equipment is configured to obtain at least part of the requested quality of service parameter set of the media type associated with the application from the database.

8. A method for enabling a user equipment to establish an application media flow with a communication network, said method comprising the steps of:
negotiating what type of media flow is to be established with the communication network; and
setting-up a bearer for the media flow which is to be established with the communication network by:
interacting with a defined quality of service database which includes quality of service parameter sets for particular applications and media types in the form of a plurality of tables, where each table is associated with a particular application, and where each table has a plurality of rows, and where each row includes a media type, a requested quality of service parameter set; wherein the database is adapted to be populated by an operator with quality of service parameter sets for particular applications and media types,
obtaining, from the database, at least part of the requested quality of service parameter set of the media type associated with the application;
sending, to the communication network, the requested quality of service parameter set;
receiving, from the communication network, a negotiated quality of service parameter set; and
determining whether or not to accept the negotiated quality of service parameter set.

* * * * *